United States Patent Office 3,677,977
Patented July 18, 1972

3,677,977
ORGANOSILICON COMPOUNDS CONTAINING
SILAZANE AND SILOXANE LINKAGES
Richard Paul Bush, Penarth, and Bryan Thomas, Thomastown, Wales, assignors to Dow Corning Limited, London, England
No Drawing. Filed Oct. 22, 1970, Ser. No. 83,180
Claims priority, application Great Britain, Oct. 31, 1969, 53,571/69
Int. Cl. C08g 33/10
U.S. Cl. 260—47 R
10 Claims

ABSTRACT OF THE DISCLOSURE

Organosilicon compounds having both silazane (Si-N-Si) and siloxane (Si-O-Si) linkages are prepared by reacting (1) a hydroxyl containing organic or organosilicon material with (2) a cyclic silazane or cyclic siloxazane having from 6 to 12 members in the cyclic structure and 1, 2 or 3 groups of the general formula

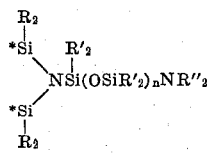

where the free valence bond on each of the Si* atoms is attached to another member of the cyclic silazane or siloxazane structure, R is any monovalent hydrocarbon radical of less than 7 carbon atoms, R' is a monovalent hydrocarbon or halogenohydrocarbon radical of 1 to 18 carbon atoms, R'' is H or an alkyl radical of 1 to 5 carbon atoms and $n$ is 0 or 1.

---

This invention relates to a process for the preparation of nitrogen-containing organosilicon compounds and also relates to organosilicon compounds produced by the process.

According to the invention, there is provided a process for the preparation of a compound containing nitrogen and silicon which comprises reacting (i) an organic or organosilicon material having in the molecule at least one ≡COH group or ≡SiOH group or both, and (ii) a cyclic silazane or cyclic siloxazane having a cyclic structure of from 6 to 12 members and from 1 to 3 inclusive groups of the general formula

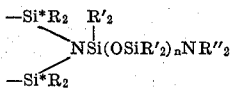

wherein the free valency bond of each of the two Si* atoms is attached to another member of the cyclic silazane or cyclic siloxazane structure, each R represents a monovalent hydrocarbon radical having less than 7 carbon atoms, each R' represents a monovalent hydrocarbon radical or monovalent halogenated hydrocarbon radical having 1 to 18 carbon atoms, each R'' represents a hydrogen atom or an alkyl radical having less than 6 carbon atoms and $n$ is 0 or 1.

As the reactant (i), there is employed in the process of this invention any organic or organosilicon material containing at least one hydroxyl group bonded to carbon or silicon. Thus, the organic or organosilicon material can be monomeric or polymeric and can contain one or more than one of the required groups in the molecule. If desired, the reactant (i) can comprise more than one organic or organosilicon material or a mixture of the two types. The specified ≡COH and ≡SiOH groups can also be present in the same reactant.

Examples of the operative monomeric materials (i) are phenols such as phenol, p-nitrophenol, p-aminophenol, cresol, catechol and resorcinol compounds containing phenolic groupings, for example, 2,2-bis(4-hydroxyphenol)propane, monohydric and polyhydric alcohols such as methyl alcohol, isopropyl alcohol, n-butyl alcohol, allyl alcohol, cyclohexanol, benzyl alcohol, ethylene glycol, propylene glycol, tetramethylethylene glycol, glycerol, erythritol and mannitol, carbohydrates such as arabinose and fructose and silanols such as triphenylsilanol, diphenylsilanediol and methylphenylsilanediol. Examples of polymeric materials which can be reacted with the cyclic silazane or siloxazane (ii) according to the invention are mono- or di-hydroxy terminated polyethers such as polyoxyethylenes, polyoxypropylenes and mixed polyoxyethylene-polyoxypropylene products, polyester and phenolic resins containing residual hydroxyl radicals, hydroxylated siloxanes and hydroxylated polysilarylenes. Organic or organosilicon materials containing two reactive hydroxyl groups per molecule, for example, siloxanol-terminated diorganopolysiloxanes or the compound 2,2-bis(4-hydroxyphenyl)propane, are normally preferred since they lend themselves to the formation of well-defined linear polymer structures.

As reactant (ii) in the process of this invention, there is employed a cyclic silazane or cyclic siloxazane having a ring structure of from six to twelve members and having 1, 2 or 3, and preferably 2, groups having the structure:

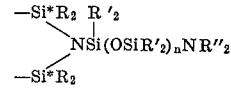

in which the free valency bond of each of the two Si* atoms is attached to another member of the cyclic silazane or cyclic siloxazane structure. In said group, the two silicon atoms Si* attached to the nitrogen atom are members of the cyclic silazane or cyclic siloxazane structure.

Depending on the nature of the cyclic structure, the silicon atoms can form part of only one group or, for example, in the case of a silazane, can be common to two or three of the specified groups.

Examples of the operative silazane and siloxazane reactants are

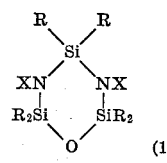  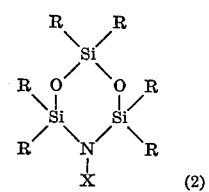

(1)        (2)

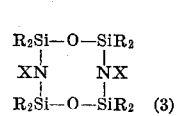  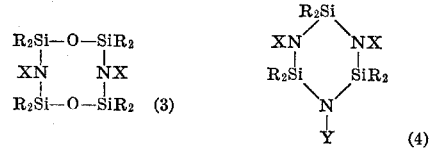

(3)        (4)

in which each X represents the group

the X group being the same or different in a given molecule, Y represents the group X or an organic or organosilicon radical, for example, an alkyl radical, an aryl radical or a triorganosilyl radical, e.g., methyl, ethyl, octadecyl, phenyl, trimethylsilyl, dimethylvinylsilyl, diphenylmethylsilyl and each R represents a monovalent hydrocarbon radical containing less than 7 carbon atoms. The cyclic silazanes and siloxazanes (ii) can be prepared by the methods disclosed in our copending U.S. application Ser. No. 809,950 filed Mar. 24, 1969, and U.S. application Ser. No. 812,300 filed Apr. 1, 1969.

Basically, such methods comprise reacting the appropriate cyclic siloxazane with a hydrocarbon-lithium compound, e.g., lithium butyl and, thereafter, reacting the lithiated siloxane or a conversion product thereof, with a halosilane (NR″$_2$)R′$_2$SiHal, where Hal represents a halogen atom and R″ and R′ are as defined above. For example, compounds having the structure (1) above in which N is 0 in the group represented by X, can be prepared by the reaction of a 1,3-diaza-5-oxa-2,4,6-trisilacyclohexane with sufficient butyllithium to react with both amine groups (NH) and reaction of the product with an aminodimethylchlorosilane.

Cyclic siloxanes of the structures (2) and (3) above can also be prepared via lithiation of the appropriate cyclic siloxazane, with or without spontaneous conversion of the lithium compound to a smaller cyclic structure, and subsequent reaction with a halosilane containing the radical —NR″$_2$.

In the cyclic silazane and siloxazane reactants (ii), the radicals R can be monovalent hydrocarbon radicals having less than 7 carbon atoms, for example, methyl, ethyl, butyl, benzyl and phenyl radicals. The radicals R′ can be monovalent hydrocarbon and halogenated hydrocarbon radicals of 1 to 18 carbons as these terms are generally accepted in the organosilicon art, for example, alkyl radicals such as methyl, ethyl, propyl, dodecyl and octadecyl, cycloalkyl radicals such as cyclopentyl and cyclohexyl, aryl radicals such as phenyl and tolyl, aralkyl radicals such as benzyl and 2-phenylethyl and haloalkyl and haloaryl radicals such as chloromethyl, bromophenyl and trifluoropropyl. Each R″ can be a hydrogen atom or an alkyl radical containing less than 6 carbon atoms. The radical can thus be, for example, —NH$_2$, —NHCH$_3$ and —N(C$_2$H$_5$)$_2$. Preferably, each R″ is methyl and each R′ is an alkyl radical having less than 7 carbon atoms, the vinyl radical or the phenyl radical.

Usually the reaction between the hydroxylated organic and/or organosilicon material (i) and the cyclic silazane or cyclic siloxazane (ii) takes place readily when they are brought together at ambient or slightly elevated temperatures. However, higher temperatures can be employed to accelerate the reaction, if desired, provided the decomposition temperature of one or both of the reactants is not attained. The most preferred range of reaction temperatures is from 10° C. to 80° C. When the reaction product is polymeric, it can be subjected to a further heating step at temperatures up to 180° C. or more to increase its molecular weight.

If desired, solvents can be incorporated into the reaction mixture to compatibilize the components or to assist in the recovery of the reaction products. Any suitable inert organic solvent, for example, benzene, xylene, toluene, hexane or tetrahydrofuran can be used.

The process of this invention includes the reaction of at least one ≡SiOH or ≡COH group in (i) and at least one —NR″$_2$ group in (ii). The relative proportions of (i) and (ii) employed in the reaction can, thus, vary widely depending on the relative numbers of ≡SiOH, ≡COH and —NR″$_2$ groups present in the reactants, the nature of the product desired and on whether unreacted groups are desired therein.

The type of product obtained will depend on the nature of the reactants employed and in particular on the numbers of ≡SiOH, ≡COH and —NR″$_2$ groups present in the molecules of the reactants. For example, the presence of one of the specified groups in each reactant, or of one group in one reactant and two in the other, can provide simple compounds. On the other hand, the presence of two of the specified groups in one reactant and more than two in the other can result in a crosslinked polymeric product.

In a preferred embodiment of the invention, each of reactants (i) and (ii) has two of the specified groups and the resulting product is a polymer of linear or substantially linear configuration comprising cyclic silazane or siloxazane structures linked by residues derived from the organic or organosilicon reactant (i). In such linear polymers, the repeating unit can be represented by the general formula {OAO(R′$_2$SiO)$_n$R′$_2$Si-QSiR′$_2$(OSiR′$_2$)$_n$} wherein R′ and n are as above defined, Q represents a 6 to 12 membered cyclic silazane or siloxazane structure, the two silicon atoms adjacent to Q being attached directly to nitrogen atoms which are members of the cyclic structure and A represents a divalent organic or organosilicon residue resulting from the elimination of two hydroxyl radicals from a hydroxylated organic or organosilicon material, said residue being attached to the adjacent oxygen atoms by way of a C—O or Si—O linkage. The residue A can, therefore, be, for example, phenylene, diphenylsilyl, methylvinylsilyl, polydimethylsiloxy, poly(phenylmethyl)siloxy and —CH$_2$(CF$_2$)$_4$CH$_2$— group, among numerous others. As hereinbefore indicated, the preferred reactants (i) are 2,2-bis(4-hydroxyphenyl)propane, diorganosilanediols and hydroxyl-terminated polydiorganosiloxanes, the organic radicals in the two latter being selected from monovalent hydrocarbon radicals and monovalent halogenated hydrocarbon radicals. Preferably, therefore, A represents the residue —PhC(CH$_3$)$_2$Ph—, in which Ph represents the phenylene radical or the residue

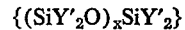

wherein Y′ represents a monovalent organic radical, for example, a monovalent hydrocarbon or substituted hydrocarbon radical of 1 to 18 carbon atoms, e.g., the methyl, ethyl, propyl, octyl, octadecyl, vinyl, allyl, phenyl, benzyl, tolyl, aminopropyl, N-beta - aminoethyl-gamma - aminopropyl, bromophenyl and 3,3,3-trifluoropropyl radicals and $x$ is zero or an integer.

The compounds and polymers prepared according to the process of this invention are useful for conferring water repellency on substrates and in the preparation of elastomers.

The process of this invention also finds application in the preparation of crosslinked organic and organosilicon materials.

The following examples illustrate the invention.

EXAMPLE 1

2,2-bis(4 - hydroxyphenyl)propane (4.1 g.), diethyl ether (5 ml.) and 1,3-bis(dimethylaminodimethylsilyl)-2,2,4,4,6,6-hexamethyl-1,3-diaza-5-oxa - 2,4,6 - trisilacyclohexane (2.22 g.) were mixed and the mixture refluxed for 1 hour, dimethylamine being evolved. The solvent was then removed from the reaction mixture, the temperature increased to 150° C. and the product maintained at this temperature under vacuum for 100 hours. There was obtained as the reaction product a yellow, glassy solid having a molecular weight of 28,000. This material was a polymer containing the repeating unit

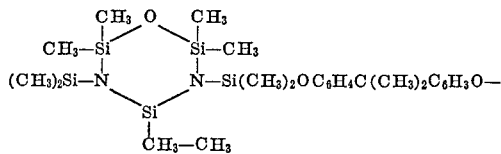

EXAMPLE 2

1,3-(bis(dimethylaminodimethylsilyl)-5 - trimethylsilyl-2,2,4,4,6,6-hexamethylcyclotrisilazane (7.31 g.) was added to a solution of bis-phenol A (3.41 g.) in diethyl ether (10 mls.). The mixture was refluxed for 1 hour, the solvent was then distilled off and the residue heated at 150° C. for 50 hours. At the end of this period, volatile materials were removed by heating for a further 24 hours under vacuum (1 mm. Hg). The product remaining was an almost colorless glassy polymeric material having a molecular weight of 23,000 and characterized by the repating unit

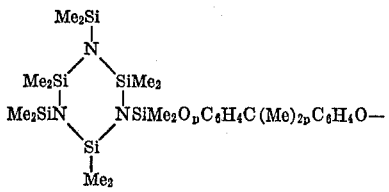

where Me represents the methyl radical.

EXAMPLE 3

The cyclic silazane employed in Example 2 (1.92 g.) was added to a solution of a hydroxy-terminated polydimethylsiloxane (2.47 g., 5.34% wt. —OH) in diethyl ether (3 ml.). The mixture was refluxed for one hour, the solvent removed by distillation and the residue heated at 150° C. for 50 hours. At the end of this period, volatiles were removed by heating for a further 24 hours under vacum (1 mm. Hg). The product remaining was a viscous liquid polymer having a molecular weight of 4,000 having a repeating unit similar to that of the polymer of Example 2 except that the bis-phenol A residue was replaced by a dimethyl siloxy residue.

EXAMPLE 4

The cyclic silazane employed in Example 2 (1.53 g.) was added to a solution of 2,2,3,3,4,4-hexafluoro-1,5-pentanediol (0.66 g.) in diethylether (3 ml.). The mixture was refluxed for one hour, the solvent removed and the product treated as in Example 3. After removal of volatiles, the residue was a viscous, liquid polymer having a molecular weight of 8,500.

EXAMPLE 5

The cyclic siloxazane employed according to Example 1 (1.46 g.) was reacted with 1,4-butanediol (0.304 g.) according to the method of Example 3. The product was a viscous liquid polymer having a molecular weight of 3,000.

That which is claimed is:

1. A process for the preparation of a compound containing nitrogen and silicon which comprises reacting (i) a hydroxylated organic or organosilicon material having in the molecule at least one $\equiv$COH group or $\equiv$SiOH group or both and selected from the group consisting of phenols, monohydric alcohols, polyhydric alcohols, carbohydrates, silanols, monohydroxy and dihydroxy terminated polyethers, polyester resins containing residual hydroxyl radicals, phenolic resins containing residual hydroxyl radicals, hydroxylated siloxanes and hydroxylated polysilarylenes and (ii) a cyclic silazane or cyclic siloxazane having a cyclic structure of from 6 to 12 members and from 1 to 3 inclusive groups of the general formula

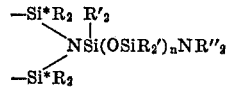

wherein the free valency bond of each of the two Si* atoms is attached to another member of the cyclic silazane or cyclic siloxazane structure, each R represents a monovalent hydrocarbon radical having less than 7 carbon atoms, each R' represents a monovalent hydrocarbon radical or monovalent halogenated hydrocarbon radical containing 1 to 18 carbon atoms, each R" represents a hydrogen atom or an alkyl radical having less than 6 carbon atoms and $n$ is 0 or 1.

2. A process as claimed in claim 1 wherein the reactant (i) has two hydroxyl groups present as $\equiv$COH or $\equiv$SiOH groups and reactant (ii) has two groups of the general formula specified in claim 1.

3. A process as claimed in claim 1 wherein each R' represents an alkyl radical having less than 7 carbon atoms, the vinyl radical or the phenyl radical.

4. The process as claimed in claim 1 wherein each R" represents the methyl radical.

5. A process as claimed in claim 1 wherein the reactant (i) is 2,2-bis(4-hydroxyphenyl)propane.

6. A process as claimed in claim 1 wherein the reactant (i) is a diorganosilanediol or a hydroxyl-terminated polydiorganosiloxane wherein the organic radicals are monovalent hydrocarbon radicals or monovalent halogenated hydrocarbon radicals of 1 to 18 carbon atoms.

7. A polymer having therein units of the general formula $$\{OAO(R'_2SiO)_nR'_2SiQSiR'_2(OSiR'_2)_n\}$$

wherein R' and $n$ are as defined in claim 1, Q represents a 6 to 12 membered cyclic silazane or cyclic siloxazane structure in which the organic radicals attached to the silicon atoms are monovalent hydrocarbon radicals containing less than 7 carbon atoms, the two silicon atoms adjacent to Q being attached directly to nitrogen atoms which are members of the cyclic structure, and A represents a divalent organic or organosilicon residue obtained by the elimination of two hydroxyl radicals from a phenol, monohydric alcohol, polyhydric alcohol, carbohydrate, silanol, dihydroxy-terminated polyether, polyester resin containing residual hydroxyl radicals, phenolic resin containing residual hydroxyl radicals, hydroxylated siloxane or hydroxylated polysilarylene, the residue being attached to the adjacent oxygen atoms by way of a C—O or SiO linkage.

8. A polymer as claimed in claim 7 wherein each R' represents an alkyl radical having less than 7 carbon atoms, a vinyl radical or a phenyl radical.

9. A polymer as claimed in claim 7 wherein A represents the residue —PhC(CH₃)₂Ph— wherein Ph represents the phenylene radical.

10. A polymer as claimed in claim 7 wherein A represents the divalent residue $\{-SiY'_2O\}_xSiY'_2-$ wherein Y' represents a monovalent organic radical of 1 to 18 carbon atoms and $x$ is 0 or an integer.

References Cited

UNITED STATES PATENTS

| | | | |
|---|---|---|---|
| 3,422,060 | 1/1969 | Fink | 260—46.5 |
| 3,575,922 | 4/1971 | Fink | 260—46.5 |
| 3,043,798 | 7/1962 | Boyer et al. | 260—46.5 |
| 3,366,593 | 6/1968 | Breed et al. | 260—33.6 |
| 3,590,021 | 6/1971 | Bush | 260—46.5 E |

DONALD E. CZAJA, Primary Examiner

M. I. MARQUIS, Assistant Examiner

U.S. Cl. X.R.

260—2 S, 46.5 E, 46.5 G, 75 N, 78.3 R, 78.4 R, 209 R, 448.2 E, 448.2 N